United States Patent [19]
Tomik

[11] 3,714,990
[45] Feb. 6, 1973

[54] AUGER PLOW

[76] Inventor: George A. Tomik, Willow Hill Farm, Peotone, Ill. 60468

[22] Filed: Nov. 12, 1970

[21] Appl. No.: 88,636

[52] U.S. Cl. ........................... 172/58, 37/81, 37/92, 172/108, 172/532, 299/39
[51] Int. Cl. ............................................. A01b 33/04
[58] Field of Search ........................... 172/33, 47–49, 172/58, 63–64, 107–109, 112, 113, 116, 168, 527, 532; 37/81, 92, 99, 43; 171/97; 173/26; 299/39, 41, 68; 175/413; 47/1.42

[56] References Cited

UNITED STATES PATENTS

| | | | |
|---|---|---|---|
| 3,255,829 | 6/1966 | Smith | 172/108 |
| 1,177,039 | 3/1916 | Kerst | 172/58 |
| 1,835,670 | 12/1931 | Popp | 172/108 |
| 1,365,192 | 1/1921 | Petit | 37/92 |
| 3,235,018 | 2/1966 | Troeppl | 175/413 |
| 2,560,352 | 7/1951 | Kelsey | 299/41 |
| 2,563,926 | 8/1951 | Elliott et al. | 47/1.42 |

FOREIGN PATENTS OR APPLICATIONS

| | | | |
|---|---|---|---|
| 565,900 | 1960 | Belgium | 37/43 C |
| 137,545 | 6/1950 | Australia | 172/107 |

*Primary Examiner*—Robert E. Pulfrey
*Assistant Examiner*—C. W. Hanor
*Attorney*—Richard J. Myers

[57] ABSTRACT

A pair of laterally and vertically spaced powered auger type plow arrangements in furrow overlapping relation to one another and coupled to the rear of a tractor, each plow arrangement including a tubular auger housing and auger disposed therein and inclined downward at its forward end, the auger having a protruding earth penetrating tapered nose portion and a removable leading cutting edge with forward scarifiers thereon spaced just rearwardly of the nose portion and an auger shaft extending longitudinally in the housing and having a plurality of rearwardly located screw lead portions, the housing having a forward downwardly rearwardly sloped flat portion and an elliptical inlet opening therein and having laterally rearwardly curved rear end portion having adjustable discharge opening whereby the earth is scooped into the front of each arrangement and discharged out the rear and upwardly therefrom propelling the plow arrangements forwardly in aid of the motive power of the tractor.

9 Claims, 5 Drawing Figures

INVENTOR.
GEORGE A. TOMIK
BY
Richard J. Meyers
ATTORNEY

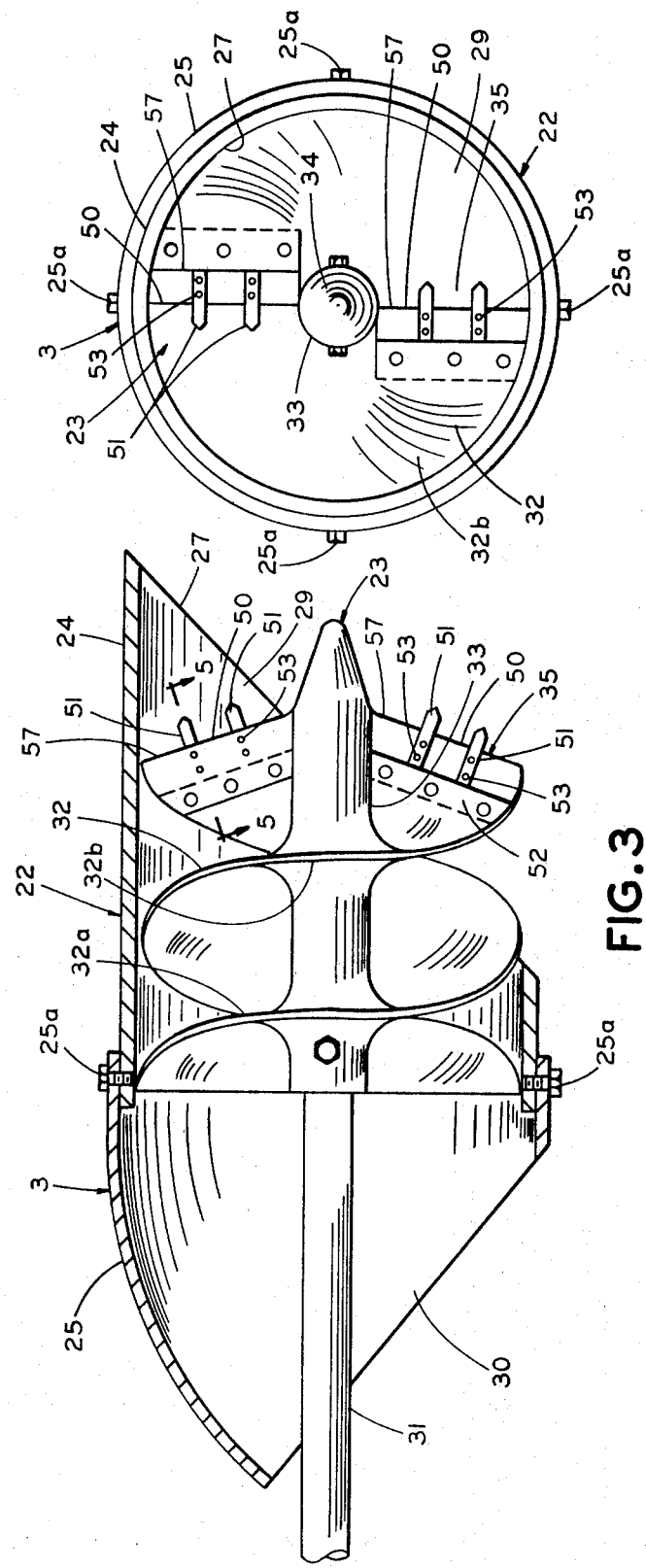

AUGER PLOW

BACKGROUND OF THE INVENTION

1. Field of the Invention

This invention relates to an agricultural earth working tillage implement of the rotary driven type for loosening and turning over the earth in preparation of the farmland seed bed and in particular relates to a powered auger type plow arrangement.

2. Description of the Prior Art

The tillage implement in general use throughout the world is the conventional mold-board plow. The operation of the mold-board plow requires a great amount of power due to the shearing action of its wide face blades and therefore resultant high frictional forces are encountered in the earth as this type of plow moves through the ground in loosening and turning over the soil with its stationary plow cutting edge.

SUMMARY OF THE INVENTION

It is, therefore, a general object of this invention to provide an improved tractor-drawn plow of the power-driven auger type that reduces the power required for tillage operation. In this inventive device there is provided a power-driven rotating auger encased within an auger housing open at both entrance and exit ends wherein a leading auger cutting edge shaves the soil and the earth enters the front end of the auger plow, thoroughly mixed in the housing interior, and is carried rearwardly through the plow housing interior and expelled in a loose condition, free of clods, at the rear portion of the plow. Two or more auger type plows may be placed in laterally spaced but vertically furrow overlapping relation and the rotating cutting edges and the screw action of the auger in the soil reduce considerably the pulling power requirement of the pulling tractor permitting the use of lower powered and lighter tractor resulting in lower tractor cost and lower ground compaction by the use of a lighter weight tractor. A further advantage of this inventive design is that the housed auger plows extend longitudinally and in the direction of tractor travel to reduce draft side thrust and aid in the propelling of the plow arrangement straight away through the soil. The axes of the auger plows are inclined forwardly downward at an acute angle to the ground surface to permit the forward ends of the augers to engage the soil below the surface of the ground and the provision of a rear end adjustable discharge of the auger housings that permits the soil to be discharged sidewardly to either side and upwardly and away from the troughs of the newly made furrows or backwardly into the furrows. The housing forward end is cut at an angle rearwardly and downwardly with respect to the ground to prevent the auger cut soil from spilling off the auger as the soil moves into the housing. The auger cutting edge of a plow may be removable and be provided with forwardly extending removable scarifier elements at its front end. By the amount of rotation or screw action of the auger the tractor traction force will be neutralized or promoted, depending on the rates of the tractor forward speed and the rotational speed of the augers. Where the forward speed of the augers equals the forward speed of the tractor, the draft power of the tractor will be only that power necessary to move the weight of the plows and propel the tractor. An increase in the auger rotational speed will proportionately reduce the thickness of the slice of the soil and assist the forward travel of the tractor. The power to drive the augers may be from the power take off of the tractor or from an independent source of power.

BRIEF DESCRIPTION OF THE DRAWINGS

FIG. 3 is an elevational longitudinal sectional view of a plow unit;

FIG. 4 is a front view of a plow unit; and

FIG. 5 is an enlarged sectional view of the removable auger front cutting edge with scarifiers taken along line 5—5 of FIG. 3.

DESCRIPTION OF THE PREFERRED EMBODIMENT

Figure 1:
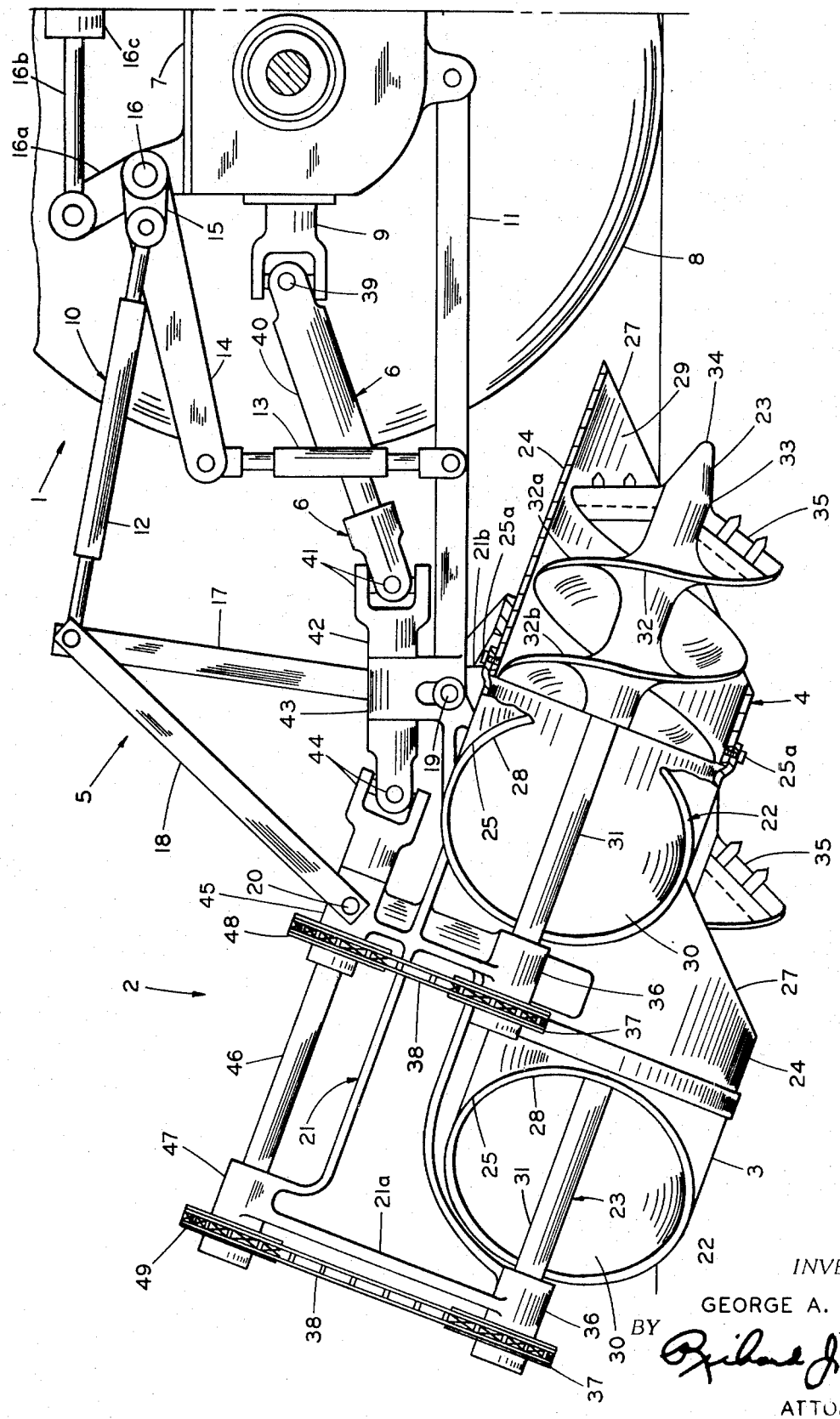
FIG. 1 is a side elevation view of a two furrow auger plow, partially shown in section, and attached through a conventional three point hitch to a tractor.
Figure 2:
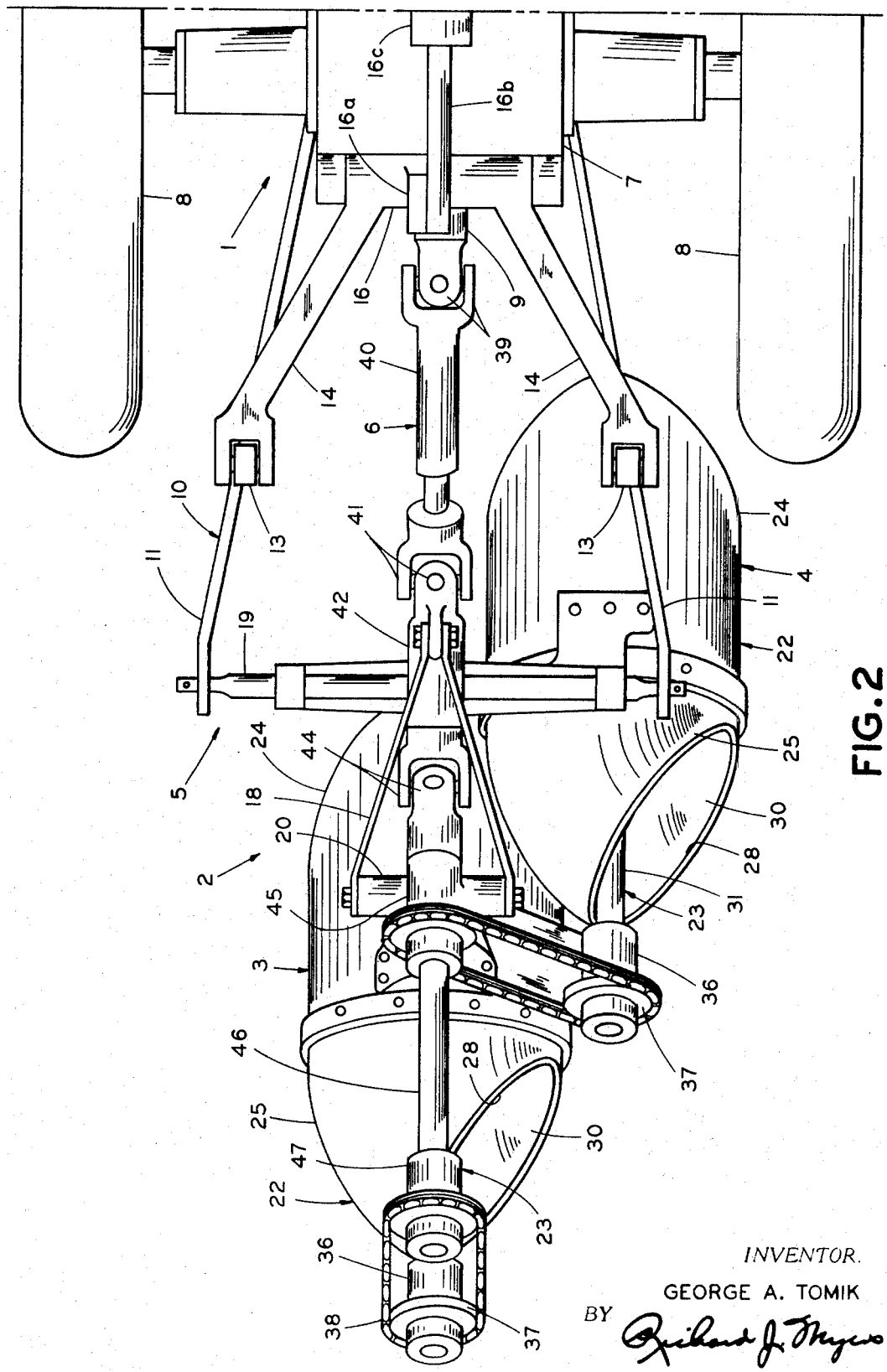
FIG. 2 is a top plan view of the plow.

With reference now to the drawings and in particular with reference to FIGS. 1 and 2, there is shown a farm tractor 1 pulling an auger plow arrangement 2 comprising a pair of laterally and vertically spaced apart auger plow units 3 and 4. The plow unit 4 is spaced somewhat forward and partially over the rear plow unit 3 in furrow overlapping relation. The auger plow arrangement 2 is connected with the tractor by auger plow arrangement supporting and pivoting structure 5. The auger plow units are driven by an auger drive mechanism 6. The tractor 1 is provided with a body 7 and wheels 8 and has at its rear end a power take off shaft 9.

The auger plow arrangement supporting and pivoting structure includes a three-point linkage 10 having lower arms 11 pivotally connecting with the sides of the tractor and a lengthwise adjustable upper arm 12 pivotally connecting with the power lift structure of the tractor. The power lift structure includes adjustable lift arms 13 and 14 and lift arm 15 for upper arm 12, the lift arms 13, 14 and 15 being connected with rock shaft 16 connecting with the conventional rock shaft drive arm 16a connecting with the piston rod 16b and cylinder 16c for raising and lowering the three-point linkage and consequently the plow arrangement 2. A vertically extending single forward support arm 17 is pivotally connected with the outer end of the upper arm 12 and two rear support arms 18 also pivotally connect with the outer end of the arm 12. A forward draft cross arm 19 pivotally interconnects the upright arm 17 and the lower arms 11 with the common rigid framework 21 fixedly carrying both auger plow units 3 and 4 and a rearward draft cross arm 20 pivotally interconnects rear diagonal support arms 18 with the framework 21 whereby through operation of the power lift or ram unit the three-point linkage is raised and lowered to pivotally adjust two cross arms 19 and 20 the inclination of the plow arrangement with respect to the ground. As seen in FIG. 1, the plow arrangement is at an acute angle with respect to the ground and is forwardly downwardly inclined to aid in penetration of the plow units 3 and 4 with the ground.

The framework 21 fixes each plow unit with respect to the other in a rigid position. Each plow unit 3 or 4 is identical in construction to the other and, therefore, the same reference characters are used on each plow unit where applicable. As shown in FIGS. 1–3, each plow unit 3 or 4 includes a tubular housing 22 and a rotating auger 23 disposed within the housing. The tubular housing 22 has a cylindrical front portion 24 and an angle elbow rear portion 25. The forward end 27 of the housing front portion 24 is at an acute angle with the axis of the auger shaft. The angle elbow rear portion 25 is adjustably and removably attached to the rear end of the cylinder front portion 24 by bolts 25a so that the rear portion 25 can be rotatably set in a multitude of positions such that the housing rear opening 30 may be facing the side of the plow (See FIGS. 1 and 2) to expel the soil away from the furrow trough or the housing rear opening may be rotated so that the opening 30 faces backward and downward to spill the soil back into the furrow trough. The housing 22 in elevational view has a rearwardly downwardly inclined front end portion 27 and has a rounded or circular rear end portion 28 in elevation. The front end portion 27 is provided with a front opening 29 somewhat circular in form for projection of the auger therefrom and is underneath the top of the front portion 24. The housing rear opening 30 is generally circular in elevation and also when viewed from the right rear side of the housing and is elliptical in plan view leaving a top opening portion as well as a side opening portion. Each auger 23 has a longitudinally extending but downwardly inclined auger shaft 31 on which is carried at its forward end an auger blade or helical sections 32 provided with two or more screw portions or leads 32a and 32b. The leading edges of helical sections 32 are provided with replaceable cutting edge means 35 and an auger spindle 33 which at its forward end has a tapered nose 34. Frame arm means 21a of the framework 21 support the auger and frame arm support means 21b support the housing (See FIG. 1) so that each auger is free to rotate within its housing while the housing remains fixed. Each auger shaft 31 is provided with an auger shaft journal 36 integral with frame 21 at its rearward end and is fixedly connected with an auger drive sprocket 37 having an auger drive chain 38 connecting with the auger drive mechanism 6.

The auger drive mechanism 6 connects with the power take off shaft 9 by means of a universal joint 39 and includes an adjustable rotating drive link 40 pivotally attached to the tractor and has at its other end a universal join 41 connecting with drive link 42 mounted in journal 43 integral to frame 21. The drive link 42 has a universal joint 44 with drive shaft 46 provided with forward journal 45 integral to auger frame 21 at its connection to the rear draft arm and a rear journal 47 on the frame 21. The drive shaft 46 is fixedly connected with forward sprocket 48 to drive the auger 23 of plow unit 4 and is fixedly connected with rearward sprocket 49 to drive the auger 23 of plow unit 3 through the respective chains 38 and auger sprockets 37 and auger shafts 31 of the respective auger units 4 and 3.

As best seen in FIGS. 3–5, the forward removable cutting edge means or unit 35 includes a pair of sharp cutting elements 50, one on each of the outer opposed portions of the leading edge of the auger helical section 32. Each cutting element 50 is provided with a pair of laterally spaced apart removable scarifier elements 51, each pair being held onto a respective element 50 by fastening means 53. Each scarifier element 51 is elongated and of square cross section and provides for initial breaking up of the soil. The forward end of the screw section 32 comprises a pair of cutting edge holding portions 52, one being on each of the leads 32a and 32b. Each cutting edge holding portion 52 is provided with a forwardly extending recessed arm 54 for receiving fastening means 56 which couple the arm 55 of the cutting element 50 to the front end portion 52. Each cutting element 50 is provided with a sharp tapered cutting edge tip 57.

Thus, what is provided is a pull behind plow auger arrangement extending longitudinally in the line of travel and held at a forward downwardly acute angle with respect to the ground by the three-point linkage of a tractor. The auger arrangement includes a pair of laterally overlapping auger units, each unit including an auger held within a housing, the auger shaft of each being longitudinally in the direction of travel and having an axis of rotation extending in the direction of travel whereby the the shaft at its forward end has a removable cutting edge which receives the ground and the auger screw portions propel the dirt through the housing. The forward face of the housing has its opening inclined at an angle with respect to the ground and the rear of the housing is provided at its top with a discharge opening. The screw action of each auger propels the auger through the ground and promotes the forward travel of the tractor. The traction force may be neutralized or promoted depending on the rates of the tractor forward speed and the auger speed of rotation. For example, assuming a tractor speed of 4 m.p.h. or 352 feet per minute and an auger with a spiral pitch of one foot or 352 r.p.m. owing to the screw action of the auger forward speed will be equal to the tractor speed, consequently the draft power required for the plow will be only to move the weight of the plow. Under this condition the auger with two cutting edges will make a 6 inch slice of soil per revolution per cutting edge. An increase in the auger r.p.m. will proportionately reduce the thickness of the slice and assist the forward travel of the tractor.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. A plow arrangement for tillage of the soil comprising:
   plow supporting structure,
   plow means including a plow unit carried by the supporting structure,
   said plow unit including a longitudinally extending generally cylindrically shaped housing having a front end soil entrance means at the front of the plow unit and a rear end soil discharge means at the rear of the plow unit longitudinally spaced from the front end soil entrance means,
   said supporting structure fixedly supporting said housing against rotation and at an inclination to the ground of the soil to be cut with the forward end of the housing being tilted downward with the rearward end of the plow being tilted upward, drive means adapted to be connected to a tractor, said plow unit including a rotatable auger disposed within the housing means and connected to be rotatably driven by said drive means and extending lengthwise of the housing means between the entrance means and the discharge means, the auger and housing having substantially a common longitudinal axis, the auger having a forward initial earth penetrating and cutting edge portion extending forwardly outwardly of the front entrance means and being substantially centrally disposed of the housing, and said auger having a rearwardly extending auger screw portion attached to the rear of the cutting portion and adjacent with the interior of the housing for directing the soil cut by the cutting edge portion rearwardly longitudinally of the plow and out the rear discharge means at the rear end of the plow, the forward portion of the front end soil entrance means has its upper portion extending in shielding manner over the forward portion of the auger screw portion and the cutting portion to prevent the sheared off soil from being cast off the auger, the lower portion of the front end soil entrance means being spaced rearwardly relative to the forward portion of the auger cutting portion with a portion of the auger cutting portion protruding from the housing for penetrating the soil ahead of the housing, whereby the forwardly and downwardly inclined housing and auger positions the forward auger cutting edge portions to shave off the earth and it is carried into the housing where the rotating action of the auger in the housing crumbles and aerates the earth and deposits same through the rear discharge means providing a furrow cut in the soil in which the trailing housing can travel.

2. The invention according to claim 1, and said plow supporting structure including a main frame fixedly supporting said plow means and tractor linkage pivotally connecting with said main frame.

3. The invention according to claim 1, and said plow means including a second plow unit, each plow unit extending longitudinally in the direction of tillage travel and one of said plow units being spaced in lateral and rearward furrow overlapping relation with respect to the other plow unit.

4. The invention according to claim 1, and said front entrance means having a front face portion inclined downwardly and rearwardly and each auger having a forward nose tip adapted to engage the soil due to the inclination of the plow unit and due to the inclination of the front face portion of the plow unit.

5. The invention according to claim 1, and said front end soil entrance means having its front face portion being tapered downwardly and rearwardly and having a front end soil receiving annular opening in said tapered face portion, the lower portion of said cutting portion extending outwardly of the lower portion of said face portion with the upper portion of the cutting portion being shielded by the forward upper portion of the entrance means.

6. The invention according to claim 1, and said cutting edge portion being removably attached to said auger screw portion.

7. The invention according to claim 1, and said cutting portion being provided with scarifying means.

8. The invention according to claim 1, and said rear end soil discharge means including a tapered rear end portion of said housing means and being provided with a side and upper discharge opening for side discharge of the soil from the housing means and upwardly from said housing means.

9. The invention according to claim 1, and said housing means including a front section having said front end soil entrance means and a rear section having said rear end soil discharge means, said rear end being removably connected with said front section for rotation of said rear section with respect to said front section whereby said rear end soil discharge means may be rotated from the side position to the down position.

* * * * *